Nov. 11, 1941.  E. K. CLARK  2,262,355

THERMOSTAT

Filed July 4, 1939  3 Sheets—Sheet 1

WITNESSES:
E.A. McCloskey.
H.C. Hepler.

INVENTOR
Earl K. Clark.
BY
W.R. Coley
ATTORNEY

Nov. 11, 1941. E. K. CLARK 2,262,355
THERMOSTAT
Filed July 4, 1939 3 Sheets-Sheet 2
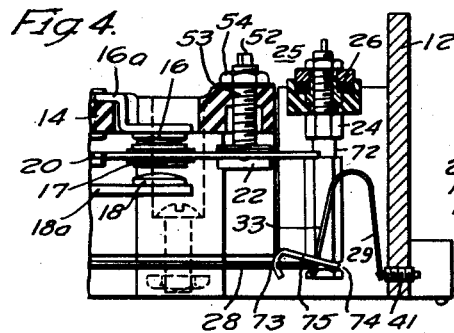
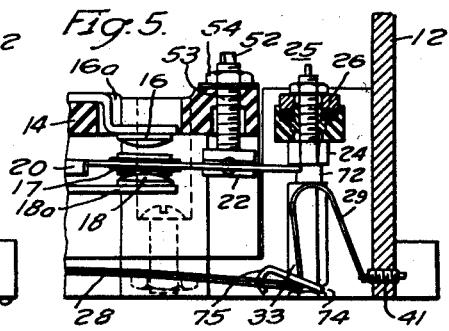
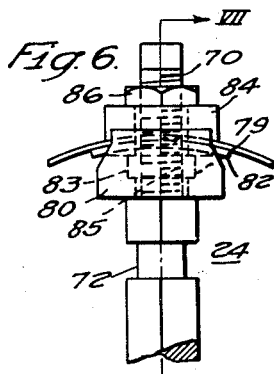
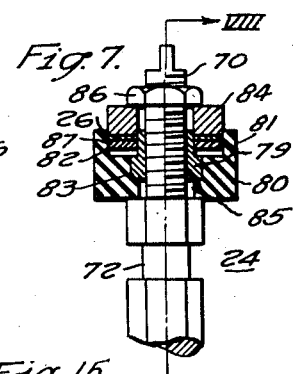
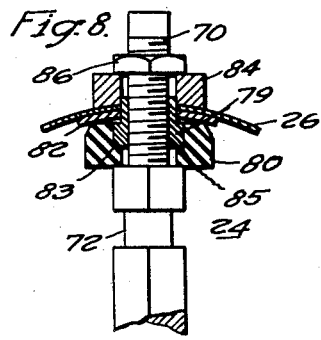
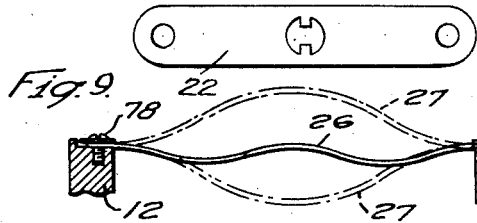
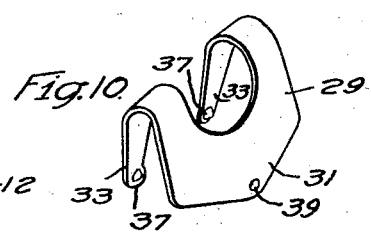
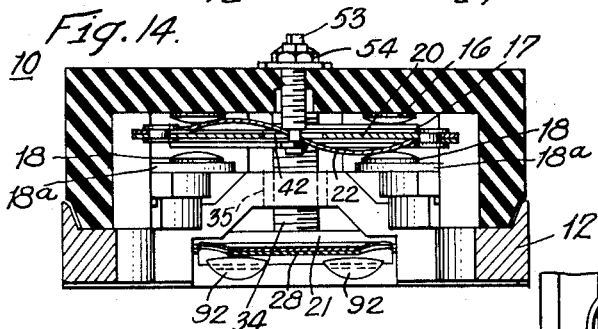
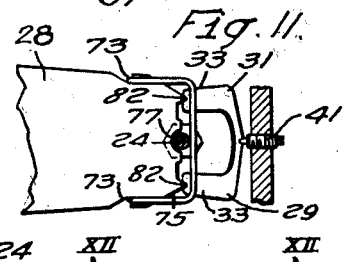
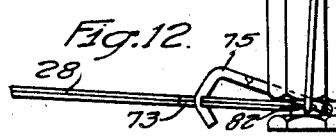
WITNESSES:
E. A. M'Closkey.
H. G. Hepler.
INVENTOR
Earl K. Clark.
BY
W. R. Coley
ATTORNEY Patented Nov. 11, 1941

2,262,355

UNITED STATES PATENT OFFICE 2,262,355

THERMOSTAT

Earl K. Clark, Mansfield, Ohio, assignor to Westinghouse Electric & Manufacturing Company, East Pittsburgh, Pa., a corporation of Pennsylvania Application July 4, 1939, Serial No. 282,776

9 Claims. (Cl. 200—139)

My invention relates to snap-acting thermostats, and more particularly to a low amplitude easily adjusted heavy-duty snap-acting thermostat particularly adapted for use with water heaters.

This application is an improvement over my copending application Serial No. 198,077, filed March 25, 1938, and assigned to the assignee of this application.

An object of my invention is to provide a heavy-duty snap-acting thermostat which will have a uniform average temperature range of operation with a constant amplitude over its whole range, so that such thermostat may be marked directly in degrees, such as Fahrenheit or centigrade.

A further object of my invention is to provide a sensitive snap-acting thermostat having a plurality of springs or resilient members compressed into elastic curves between rigid supports and an adjustable resilient member associated therewith for adjustably varying the operation of the thermostat.

A further object of my invention is to provide vernier control means for varying and regulating the operation of a snap-acting thermostat.

Another object of my invention is to provide a thermostat having an adjustable resilient member adapted to directly cooperate with the bimetallic member thereof and remotely with a main resilient member with both resilient members cooperating to give the thermostat a snap-acting make-and-break.

A further object of my invention is to provide a positive-action snap-acting heavy-duty thermostat capable of handling at least five kw. of power with a low amplitude of, say 6 to 8° Fahrenheit.

Another object of my invention is to provide a snap-acting thermostat having a plurality of springs or resilient members compressed into elastic curves between rigid supports for producing the snap action of such thermostat by eliminating frictional factors and by possessing a freedom of overcenter action.

A further object of my invention is to provide an elastic or resilient supporting member for exerting a decreasingly biasing action upon a device supported thereby as the device and resilient member move away from a given position toward a neutral position. This action, in turn, aided by an additional resilient member produces a snap action of the supported device without any frictional engagement between such device and first resilient member.

A further object of my invention is to provide a resilient member which when rigidly attached to a movable device will prohibit the movement of such device in the plane thereof but will permit and aid in ensuring a snap-acting action of the device in a direction normal to the plane thereof.

A further object of my invention is to provide a thermostat in which the contact pressure does not diminish to zero at the snapping temperature, but maintains a minimum irreducible contact pressure until switching takes place by impact.

Other objects of my invention will either be pointed out specifically in the course of the following description of a device embodying my invention, or will be apparent from such description.

In the accompanying drawings,

Figs. 4 and 5 are fragmentary views, taken along the right-hand end of the line II—II of Fig. 1, with the device in each of its two operating positions;

Fig. 6 is an enlarged elevational view of a portion of the device shown in Figs. 1 and 2;

Fig. 7 is a sectional view taken along the line VII—VII of Fig. 6;

Fig. 8 is a sectional view taken along the line VIII—VIII of Fig. 7;

Fig. 9 is a view indicating various positions of the main resilient member of the device embodying my invention;

Fig. 10 is a perspective view of a part of the device embodying my invention;

Fig. 11 is a plan view partially in section illustrating the mounting of a bimetallic member in the device shown in Figs. 1 and 2;

Fig. 12 is an enlarged partial elevational view taken in the direction indicated by line XII—XII of Fig. 11;

Fig. 14 is a sectional view taken along the line XIV—XIV of Fig. 2; and

Fig. 15 is a plan view of a member constituting part of the device embodying my invention.

Figure 1:
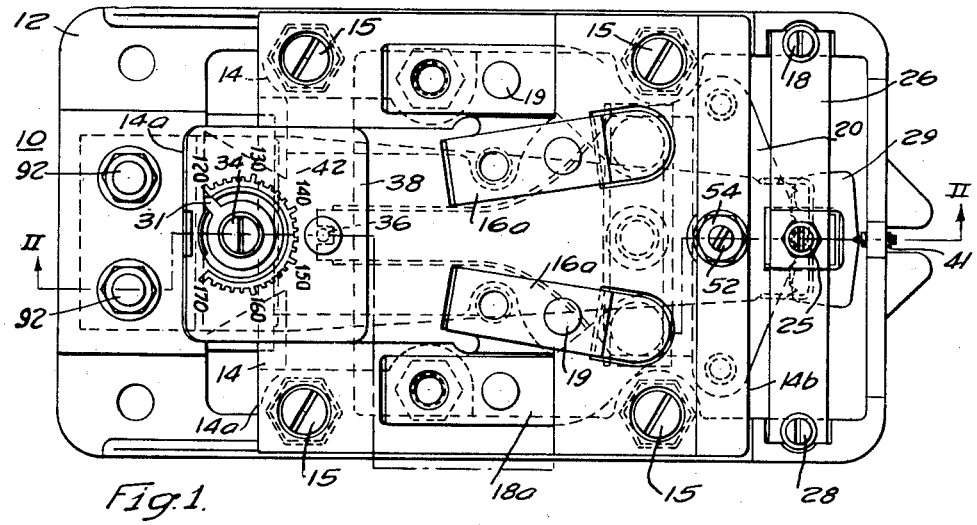
Figure 1 is a top plan view of a device embodying my invention.

Referring to the accompanying drawings, I show a heavy-duty water heater thermostat or instantaneous thermo-switch 10 including a casing 12, an inner insulating switch support member 14 having mounted thereon stationary contacts 16 and 18, a movable contact arm 20 mounted near one end on resilient member 22 and operatively associated with an impact pin assembly 25. The impact pin assembly 25 includes an impact pin 24 which is rigidly attached to a second or main resilient member 26 and operatively associated with a heat-responsive device 28 and an auxiliary U-shaped resilient member 29.

As is hereinafter described in greater detail, and as shown in Figs. 1 to 5, inclusive, and 13, the movable contact arm 20 is rotatably attached at one end to the inner insulating switch support member 14 and operatively associated with the impact pin assembly 25 at the other end. A resilient member 22 is rigidly attached to the movable contact arm 20 and pivotally attached at its apertured center to an adjusting screw assembly 52 (see Figs. 14 and 15) which in combination act as a second support for the contact arm 20. A movable contact 17, mounted intermediate the ends of arm 20, selectively engages either pair of stationary contacts 16 or 18 as the contact arm 20 moves in response to the movement of the operatively associated impact pin assembly 25. The resilient member 22 through the cooperative action of adjusting screw assembly 52 biases the contact arm 20 so that the movable contact 17 will always have a positive contact pressure with either cooperating stationary contact 16 or 18, and produces a snap-action of the contact arm 20 as it is moved from one operating position to another. In addition, the impact pin assembly 25, including the frictionlessly operating main resilient member 26 and auxiliary U-shaped resilient member 29, is operatively associated with the heat-responsive device 28 and transmits the movements of such device to the contact arm 20. The main resilient member 26 and auxiliary resilient member 29 cooperatively apply a force to the impact pin assembly 25 and heat-responsive device 28 which tends to hold them in one of their limiting positions, and as they move, to decreasingly resist the movement thereof away from said position. This in turn produces a snap action of the impact pin assembly 25 and heat-responsive device 28 as the temperature of the device reaches a predetermined operating value. Inasmuch as the contact arm 20 is operatively associated with the impact pin assembly 25, and, therefore, the heat-responsive device 28, the contact arm 20 will be moved from one operating position to another in response to the movements of heat-responsive device 28. This movement will be snap-acting in both directions, due to the combined action of resilient member 22 and the snap action of the impact pin assembly 25.

Referring to the thermostat 10 in greater detail, the casing 12 is preferably made of a die-cast construction and of such metallic material that it will withstand severe mechanical shock and readily conduct heat. However, it is to be understood that the casing 12 may be formed of any material desired and may be made in any manner whatsoever so long as it affords suitable means for mounting the operative parts of the thermostat thereon.

The inner switch support member 14 is preferably formed of substantially flat suitably apertured insulating material and, in general, is rectangular in shape, having end surfaces indicated by the reference characters 14a and 14b. Member 14 supports the movable contact arm 20 and stationary contacts 16 and 18. Member 14 is rigidly attached to the casing 12 by a plurality of screws 15. The inner support member 14 has an aperture 32 extending vertically therethrough, through which a suitable adjustable control shaft or screw 34 may be inserted, as hereinafter described.

Stationary contacts 16 and 18 (two of each) are respectively mounted on bent straps 16a and 18a, which are preferably rigidly attached to different portions of the insulating inner support member 14 by rivets 19, whereby the two contacts 18 will be respectively positioned substantially directly below the two contacts 16 and spaced a predetermined distance apart therefrom. The movable contact arm 20, having contacts 17 insulatedly attached thereto, is mounted upon the supporting member 14 in such a manner that contacts 17 will be free to engage either set of the stationary contacts 16 or 18, as hereinafter more fully described.

Figure 2:
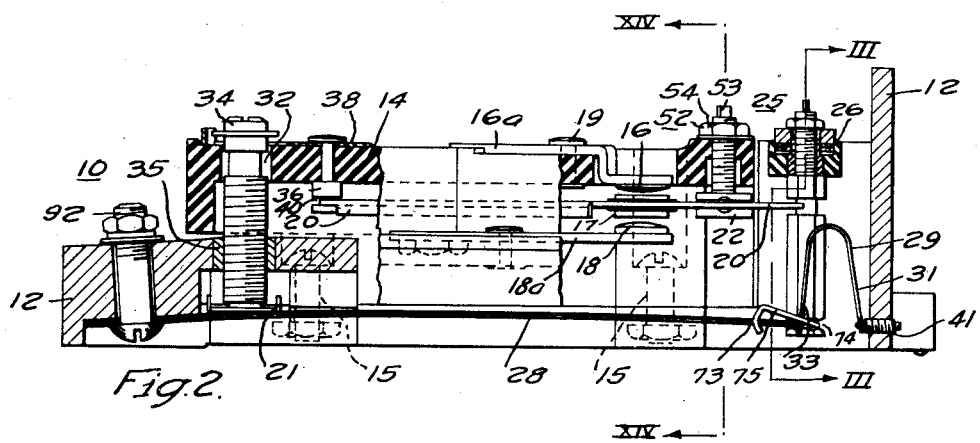
Fig. 2 is a view, partially in elevation and partially in section, taken along the broken line II—II of the device shown in Figure 1.

The movable contact arm 20 is guided or movably supported at one end thereof by means of shoulder pin 36, which functions, in this instance, as a fulcrum. The shoulder pin 36 is rigidly attached to the inner support member 14 substantially as shown in Figs. 1 and 2. The movable contact arm 20 has a notch (not shown) which is adapted to cooperate with an annular notch 40 positioned within the shoulder pin 36 so as to permit the contact arm 20 to be supported thereby. The contact arm 20 is thus free to move or rotate about the shoulder pin as a fulcrum.

The contact arm 20 has an aperture located therein (not shown) which is positioned substantially on the central or longitudinal axis somewhat near the movable end thereof. This aperture is adapted to permit the passage of the resilient member 22 therethrough for resiliently mounting the contact arm 20 through adjusting screw assembly 52.

The resilient member 22 is a flat strip of spring material preferably longer than the width of the contact arm 20. It is thus apparent that the resilient member 22, as it is rigidly attached to the contact arm 20 with the central portion extending therethrough, will be biased into and confined to an elastic curve with one end attached to the top surface and the other end attached to the lower surface of the contact arm 20. The resilient member 22 thus has an unstable position along substantially a horizontal plane in the center of its configuration. Due to this unstability, the central portion of the member 22 will tend to move to one or the other of its extreme vertical positions, as is more clearly described in my above identified copending application.

An adjusting screw assembly 52, including screw 53, has a threaded engagement with the insulating inner support member 14 and is prevented from turning therein by means of a lock nut 54, substantially as shown in Figs. 2, 4 and 5. The adjusting screw assembly 52 has an annular notch (not shown) formed in the lower portion thereof to afford suitable connection with the resilient member 20 as is more fully described in my above-identified copending application.

With the movable contact arm 20 mounted upon insulating support 14 by means of adjusting screw assembly 52 and resilient member 22, at one end, and by shoulder pin 36 at the other end, such contact arm 20 is prohibited from moving in its plane by reason of the cooperative action of the rigidly attached resilient member 22 and adjusting screw assembly 52, and shoulder pin 36. However, it is to be understood that, due to the contact arm 20 being supported at one end by resilient member 22 and due to the resiliency of member 22, and its fundamental elastic curvature, the movable end of contact arm 20 will be permitted to move substantially vertically or axially to the adjusting screw assembly 52 with a snap action.

The adjusting screw 53 permits the central portion of the resilient member 22 to be positioned substantially midway between the stationary contacts 16 and 18. With the contact arm 20 positioned substantially at the midpoint between the stationary contacts 16 and 18, the vertical biasing action of the resilient member 22 upon such member 20 will be substantially zero. In other words, since the vertical biasing action of resilient member 22 upon contact arm 20 will be substantially zero, the contact arm 20 theoretically could remain in a neutral position. However, it is to be understood that because of the inherent characteristics of member 22, it would be practically impossible to position the contact arm 20 in this neutral position. Accordingly, it will be apparent that this description of contact arm 20 is merely for the purpose of explaining the operation of such arm.

Should the contact arm 20, when positioned at a neutral position, be forced either upwardly or downwardly from this neutral position, by some external force, the resilient member 22 would become unbalanced. The member 22 would then force the arm 20 to move in the vertical direction of the externally applied force with an accelerating motion, until the movable contacts 17 positioned on arm 20 would engage the stationary contacts 16 or 18. It is, therefore, obvious that this accelerating action of the resilient member 22 upon arm 20 produces a snap action thereby, and ensures a positive contact pressure at all times.

With the adjusting screw 53, resilient member 22 and contact arm 20 adjusted in such a manner, the contact arm 20 will, when in either static or limiting position, have an equal biasing action or contact pressure between movable contacts 17 and the cooperating stationary contact 16 or 18. The amount of this biasing action or contact pressure is shown as C or C' in Fig. 13, and is that force which is exerted by resilient member 22 independently of any exterior or additional forces.

The impact pin assembly 25, shown in Figs. 2 to 8, inclusive, includes an impact pin 24, the second or main resilient member 26, the auxiliary U-shaped resilient member 29, and a spring guide member 80 operatively associated with the impact pin 24. The impact pin 24 has an upper smaller diameter threaded portion 70, an annular notch 72, substantially in the center thereof, and a tapered annular notch 74 positioned in the lower end thereof. The guide member 80, see Figs. 6, 7 and 8, has a plurality of upwardly or vertically extending guides 81 located thereon and a vertically extending centrally located aperture 83 therethrough. A vertically extending insert 79 is positioned within the aperture 83, and has a vertically extending threaded aperture 85 positioned substantially in the center thereof. The guide member, including insert 79, is then threaded on the upper threaded portion 70 of impact pin 24 by means of a threaded aperture 85 in insert 79. The guide member is, in this instance, formed so that it will position the resilient member at such a point with respect to pin 24 that such pin will move an equal distance above and below a neutral plane.

Figure 3:
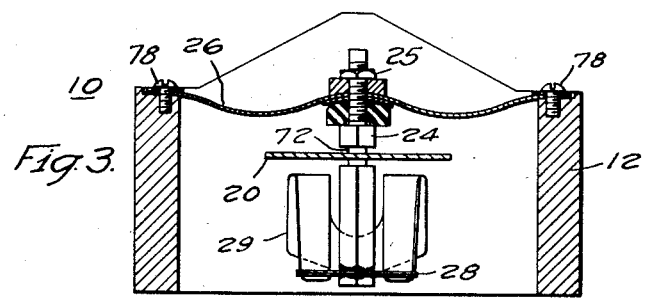
Fig. 3 is a sectional view taken along the line III—III of Fig. 2.

The second or main resilient member 26 is preferably a flat strip of spring material and is rigidly attached at its ends to the casing 10 by means of screws or rivets 78, or the like, and is likewise rigidly attached at substantially the center, to the impact pin assembly 25, as hereinafter described and as is clearly shown in Fig. 3. This resilient member 26 is forced to retain the double symmetrical elastic curve, as shown in Fig. 3, due to the cooperative action of the impact pin assembly 25 and the rigid end supports, as hereinafter described. The impact pin assembly forces the resilient member to substantially retain this elastic curvature which would otherwise assume a stable form of curvature.

The main resilient member 26 is longer than the distance between its rigid supports on rivets 78. It, therefore, follows that the member 26 if not restrained, would then, when forced longitudinally inwardly from either one or both ends, assume one of the limiting stable elastic curves shown by dotted lines 27 and 27', in Fig. 9. It is understood that such member may assume a position which would be the reverse of the curve as shown by 27' in Fig. 9.

It is, therefore, obvious that, should the central portion of the main resilient member 26 be retained substantially in a plane parallel to the member 26 or in a curvature other than that which such member would normally assume, such member will be restrained or prohibited from assuming one of its normal stable elastic curves as the ends thereof are biased inwardly. However, it is to be understood that, due to the inherent characteristics of the main resilient member 26, such member will attempt to assume one of the stable elastic curves 27 or 27', depending on which side of the neutral the central portion is positioned in respect thereto.

It, therefore, follows that, as the central portion of the main resilient member attempts to assume a curve similar to 27 or 27', it will exert a force normal to the p'ane of such resilient member. The force so exerted by the resilient member 26 will be substantially directly proportional to the distance of travel of the central portion of such member from its neutral position. This is clearly shown by Fig. 13. In other words, it is to be understood that the closer the central portion of the resilient member be biased to a central or neutral position, from the normal assumable curvature, the less such vertical force will be. The main resilient member 26 compressed into the stable elastic curve produces a freedom of overcenter action.

It, therefore, follows that the vertical biasing force of the resilient member 26 may also be varied by adjusting the horizontal force. This force value may be adjusted in an additional manner; namely, by adjusting or varying the positions of the end supports, it being understood that the closer such supports are positioned (or moved) towards the central portion, or in this instance towards the impact pin assembly 25, the greater the horizontal force. Accordingly, as hereinabove described, the vertical force will be increased. The vertical force may also be obviously reduced, by moving the end supports of resilient member 26 away from its central portion.

The vertical biasing action of the main spring 26 is, in this instance, not of itself sufficient to move the impact pin assembly 25 from either of its two extreme stationary or operating positions with snap action or quick movement. However, as is clearly shown in Fig. 13 and as hereinafter described, such main spring 26 is adapted to furnish a maximum amount of the biasing action upon the impact pin assembly 25. The balance of such biasing action is furnished by the readily adjustable auxiliary resilient member 29, as hereinafter described.

The auxiliary resilient member 29 is, in this instance, formed from a single piece of resilient material (see Fig. 10). Such member comprises a main portion 31 and two finger portions 33 which are bent back towards the main portion. The member 29 is thus formed into a U-shaped structure having the fingers 33 on one side and the main portion 31 on the other side. Suitable inwardly extending protuberances 37 are formed within the lower end of the fingers 33 to cooperate with the bimetallic member as hereinafter described. In addition, a protuberance 39 is positioned within the lower part of the main portion 31 to cooperate with a suitable adjusting screw 41, as hereinafter described.

The fingers 33 and the main portion 31 of auxiliary resilient member 29 engage the free end of the bimetallic member 29 and the set screw 41, respectively, (see Figs. 11 and 12). The finger portions 33 are thus adapted to bias the free end of the bimetallic member 28 substantially along the longitudinal axis thereof. However, such biasing action will be along the plane of bimetallic member 28 only when such member and the operatively associated impact pin assembly 25 are in their neutral position (see Figs. 2 and 12). When the structure is in its lower operating position (see Fig. 5) the fingers, exerting a biasing action normal thereto, will produce a downwardly or transverse biasing action upon the impact pin assembly. Further when the structure is in its upper operating position (see Fig. 4) the fingers produce an upwardly or transverse biasing action upon the assembly 25. The vertical biasing actions upon the bimetallic member 28 and assembly 25 decrease as the assembly approaches its central or neutral position and then changes its direction, increasing in the reverse direction as the assembly approaches the second operating position.

It is obvious that the greater the vertical or normal displacement of the central portion of the main resilient member 26 and the impact pin 24 the greater will be the force required to move such structure toward its neutral position, and that the closer such structure approaches the neutral, a correspondingly smaller amount of force will be required to continue the movement. This feature is likewise true of the auxiliary resilient member 29. In other words, as hereinabove described, the combined vertical biasing force of the main resilient member 26 and the auxiliary resilient member 29 is substantially directly proportional to the vertical displacement of the center of the main spring 26, the impact pin 24 and the auxiliary member 29 from their neutral or dead center positions. Accordingly, should the impact pin assembly 25 be biased towards the neutral with a substantially constant value of force, it follows that the main resilient member 26 and auxiliary resilient member 29 will be accelerated due to the net acting or accelerating force. This composite condition results in an energy of motion, which, in addition to the applied substantially constant force, will cause the impact pin 24 to pass through the neutral. The inherent action of the main resilient member 26 and auxiliary spring 29 will then aid the applied force, resulting in the impact pin 24 travelling with a continued acceleration.

It is to be understood that the so-called neutral position of the impact pin assembly 25 is that position from which both the effective relative upward and downward biasing forces of both the main resilient member 26 and auxiliary resilient member 29 will be equal, or that position in which the central portion of the main resilient member 26 and the fingers 33 of auxiliary member 29 exerts a zero vertical force component. In this instance, this so-called neutral position is substantially in a straight line with the end supports or rivets 78, and with the fingers 33 of auxiliary member 29 substantially normal to the bimetallic member 28.

The neutral position of resilient members 26 and 29 need not be in the exact center of bimetal and impact pin travel. However, the force dimension relationships of these two resilient members will be a straight line and will, therefore, algebraically add to a value illustrated by the composite spring line (see Fig. 13). The difference in bias caused by the two resilient members, with their neutral positions shifted with relation to center of the bimetal and impact pin travel, will be automatically compensated for by the counteracting force of bimetal member 28 in the final adjustment of this thermostatic device.

The resilient member 26 is confined to substantially the curvature, shown in Fig. 9, by means of the cooperating action of the impact pin assembly 25 and bimetallic member 28. The impact pin assembly 25 has the effect of substantially breaking the member 26 into two separate resilient members. In other words, the resilient member 26 may be formed of at least two resilient members mounted in a straight line upon a rigid support at one end and upon, say, the impact pin 25 at the other end, it being understood that the two members be in a straight line. This structure then operates as a single member.

Inasmuch as the main resilent member 26 is unstable in this particular curvature, the impact pin 24 rigidly attached thereto, at its upper end, likewise is correspondingly unstable in its movements. This instability results in a tendency for the main resilient member 26, as such member moves from an upper to a lower position, to revert to the form of curvature illustrated by 27' (see Fig. 9). This action results in a corresponding biasing force to be present in the lower end of impact pin assembly 25. The impact pin assembly 25 then has the tendency to wabble or move in a plane normal to and along the longitudinal axis of resilient member 26. However, inasmuch as the lower end of impact pin assembly 25 is firmly attached to and restrained from movement in this plane by the bimetallic member 28 and spring clip 75, such impact pin assembly 25 will be limited to substantially a vertical movement along the axis of impact pin 24.

The resilient member 26 has an aperture located substantially in the central portion thereof. The impact pin 24 is inserted through the aperture in resilient member 26 and rigidly attached thereto as follows: The upper end of the threaded portion 70 and the upper end of insert 79, which extends above the guide 80, are inserted through the aperture located within the resilient member 26. The upwardly protruding portions 81 and insert 79 in combination with the top surface of support 80 function, among other things, as a saddle or support for the resilient member 26.

A convex washer 82 is positioned above the guide 80 within the upwardly extending protruding portions 81 in juxtaposition with the lower surface of resilient member 26. A backing-up block 84 is positioned on impact pin 24 and is adapted to rest upon the resilient member 26 and to force the central portion of the resilient member against washer 82 and the saddle of guide 80. This action retains the resilient member 26 in its double elastic curve, substantially as hereinabove described. The block 84 has an enlarged aperture extending therethrough to permit telescopic engagement with the upper end of insert 79. Inasmuch as the block 84 is free to slide on impact pin 24, the position of such block with respect to guide 80 may be readily changed by rotating the pin 24 and the cooperation of a lock nut 86, and, accordingly, the shape of the central portion of the resilient member 26 may be readily changed.

The U-shaped adjustable auxiliary resilient member 29 cooperates with the movable end of the bimetallic member through the fingers 33 and with the casing 12 through the adjusting screw 41. The adjusting screw 41 has, in this instance, a pin point which cooperatively engages the resilient member 29 through the protuberance 39. The outward biasing action of fingers 33 may then be easily and readily adjusted, merely by rotating the screw 41. By running the screw 41 in it follows that the fingers will produce an increased biasing action. Inasmuch as this cooperates with the bimetallic member 28 in an angular manner, depending upon the operative position of such member, the vertical component of such force is also increased, as illustrated by 29' and 29" on Fig. 13. This holds true regardless whether the bimetallic member be in its upper position (see Fig. 4) or in its lower position (see Fig. 5). Accordingly, it follows that the vertical force exerted upon the impact pin 24 by the auxiliary member 29 may be easily and readily adjusted to any desired value by merely rotating the adjusting screw 41. This may be done at any time without impairing the operation of the thermostat.

It is, therefore, obvious that, inasmuch as the vertical force applied to the impact pin 24 is produced by the combined action of the main resilient member 26 and the auxiliary or vernier resilient member 29, such force may be easily and readily adjusted by merely rotating the adjusting screw 41.

The heat-responsive device 28, is, in this instance, a bimetallic member, and preferably formed of a flat bimetallic finger or strip having a tapered end (see Figs. 11 and 12). The bimetallic member 28 has a circular notch 90 located in tapered end thereof to cooperate with the tapered notch 74 of the impact pin 24, as hereinafter described. In addition, there is a pointed portion 82 located on each side of the centrally located circular notch 90. These pointed portions 82 are adapted to engage the protuberances 37 in the fingers 33 of auxiliary member 29. The other end of the bimetallic member 28 is rigidly attached to the casing 12 of the thermostat 10 by means of screws 92, as shown in Fig. 2. The bimetallic member 28 is preferably attached to the casing 12 at a slight angle so that the normal or unrestrained position of the free end of the bimetallic element will be above its restrained position, as shown in Fig. 2, to enable adjustable pressure to be applied to the bimetal member 28 through adjusting screw 34, at all points throughout its temperature range.

The adjusting screw 34 is rotatably attached to the casing 12 and extends through the insulating support member 14. The screw 34 has a threaded engagement with the bushing 35 which is rigidly attached to the casing 12. The adjusting screw 34 may then be moved vertically with respect to the casing 12, as it is rotated within the bushing 35.

If it be desired, a removable scale plate 38 may be positioned upon the support member 14. A scale 42 marked in degrees is located upon the plate 38, and is positioned about the adjustable screw 34. A pointer 43 is rigidly attached to screw 34 so that it cooperates with the scale 42, and thus gives a visuable indication of the particular temperature setting of the thermostat.

A fulcrum plate 21, shown in Fig. 2, is flexibly attached to the bottom of the adjusting screw 34. The fulcrum plate 29 contacts the bimetallic member 28, and, as the adjusting screw 34 is raised or lowered with respect to the casing 12, changes the curvature of the bimetallic member. The operating temperatures of the bimetallic member 28 are therefore changed. The fulcrum plate 21, therefore, operates as an adjustable fulcrum about which the bimetallic member 28 flexes. Accordingly, the vertical movement of the fulcrum plate 21 resulting from the operation of adjusting screw 34 controls the thermal operation of the thermostat 10.

Bimetallic member 28 is initially formed at normal room temperatures to a degree of curvature which will be just annulled at the midpoint of its temperature range so it will permit the most favorable, substantially 90° angular, relationship with the impact pin 24. However, it is to be understood that the bimetallic heat-responsive device 28 may be attached to the casing 12 in any manner desired, so that its movements will be readily transmitted to the impact pin 24 in a manner as hereinafter described.

The bimetallic member 28 is operatively associated with impact pin 24 through the cooperation of circular notch 90 with the tapered annular notch 74 of pin 24. This cooperation is maintained through the action of a clip spring 75 which biases the impact pin into engagement with the bimetallic member. The clip spring 75 is preferably of a material having substantially the same diameter as the width of the base of notch 74, as shown in Fig. 12. The clip spring is positioned within the notch 74 of impact pin 24, and has its ends hooked into notches 73 located within the bimetallic member 28, as shown in Fig. 11. This cooperating action prevents undue longitudinal movement of impact pin 24 with respect to bimetallic member 28.

Relatively unlimited angular movement of bimetallic member 28 with respect to impact pin 24 is permitted by the tapering of the bimetallic element 28 beyond the base of annular notch 90, as shown by Fig. 12. This movement is substantially about an axis transverse to the bimetallic member 28 and normal to the axis of the impact pin 24 at the base of annular notch 90. The points of contact 77, shown in Figs. 11 and 12, between the bimetallic member 28 and impact pin 24 are, in other words, fulcrum points through which the cooperating forces of bimetallic member 28 and impact pin 24 are transmitted, one to the other. The tapered portion of bimetallic member 28 is such that, as the member 28 flexes about fulcrum plate 29, it will transmit a vertical force to the impact pin 24 without any binding action or additional contact between member 28 and the tapered sides of notch 74. This action provides a free angular movement between the member 28 and the impact pin 24 without any lost motion relative thereto longitudinal to the pin.

The bimetallic member 28 is, accordingly, free to flex about the adjusting screw 34 and, therefore, to move the impact pin 24 substantially normal to the plane of the bimetal, without undue friction or binding action between the moving end of the bimetallic member 28 and the impact pin 24.

As hereinabove described, the rotation of adjusting screw 41 within casing 12 controls the outward biasing action of fingers 33 of auxiliary resilient member 29. It, therefore, follows that, inasmuch as the auxiliary member 29, and bimetallic member 28 are operatively associated, the adjustment of the adjusting screw 41 directly controls the differential of temperature in the bimetallic heat-responsive member 28. This results from the fact that the vertical biasing action or component of the auxiliary resilient member 29 is directly proportional to both the outward biasing action of such member and the vertical displacement of the impact pin 24 and member 28.

Figure 13:
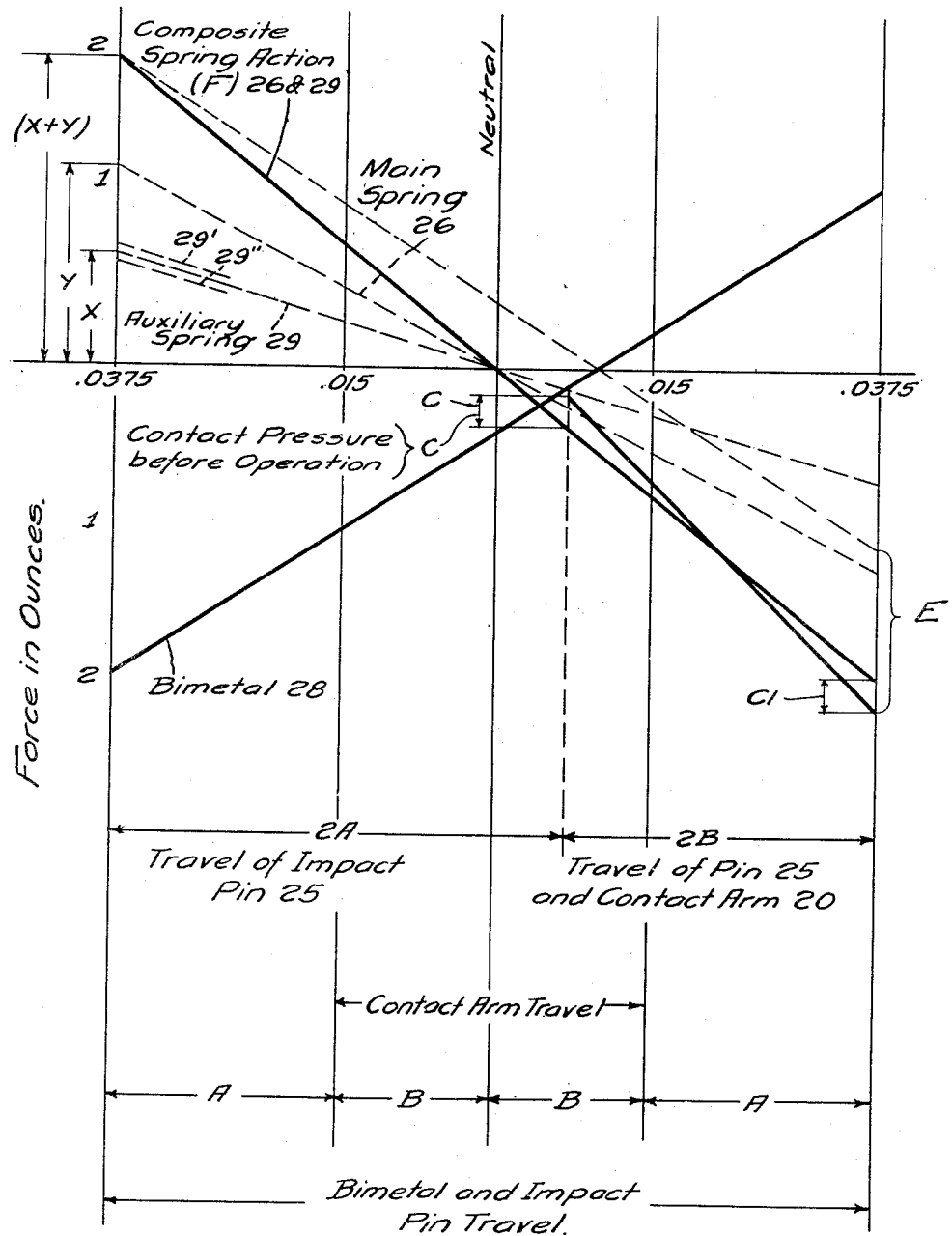
Fig. 13 is a graph illustrating the operating principle of the device embodying my invention.

As further hereinabove described, the vertical biasing force of the main resilient member 26 is directly proportional to the vertical displacement of the center of such spring or the vertical displacement of the impact pin 24 from its dead-center position. In other words, assume in this instance, that, with the impact pin 24 being displaced vertically .0375 inch from its dead-center position, the vertical biasing force of the main resilient member 26 will be substantially one and a third ounces, as is shown in Fig. 13, while the vertical biasing action of the auxiliary resilient member 29 is substantially two-thirds of an ounce. These combined forces acting through impact pin 24 upon the bimetallic member 28, thus total substantially two ounces (see Fig. 13). It is, therefore, apparent that the operatively associated bimetallic heat-responsive member 28 will remain in its extreme fixed position until a corresponding counterbalancing force is created therein, due to the annulment of its deflection, resulting from a change in its temperature. A counterbalancing force will be obtained at a point slightly before the thermostat's operating temperature is reached.

Fig. 13 shows the conditions which exist, at a given operating temperature, and those which exist throughout the travel of the bimetallic member 28 and associated parts as they snap from one position to another at that same temperature. The bimetallic elastic curve, shown transposed as the upper dotted line, is above the curve representing the total force produced by auxiliary resilient member 29 and over-center resilient member 26 (shown as a composite curve F), and shows the bimetal and the biasing spring component exactly balanced just prior to its snapping temperature. Fig. 13 represents these conditions regardless of the direction of operation of the thermostat. It is understood that the left side of the graph represents the starting action of the thermostat.

When the force produced by the bimetallic heat-responsive device 28 becomes slightly greater than the force exerted by springs 26 and 29, or in this instance, two ounces, it is apparent that such force will overcome the biasing actions of the main resilient member 26 and auxiliary resilient member 29. The free end of bimetallic member 28, and the impact pin 24, will then move in a vertical direction or in a direction normal to resilient member 26 and substantially normal to the line of force exerted by auxiliary resilient member 29 until they reach a second static position. As the impact pin 24 starts moving, the vertical distance between the original fixed or static position of the main resilient member 26 and auxiliary resilient member 29 and the neutral positions thereof will be reduced, whereupon the biasing action of such resilient members 26 and 29 toward their original positions will likewise be reduced, as can be readily seen from Fig. 13. These values will be zero at the dead-center position. The bimetallic force is likewise reduced. However, this force is reduced at a lesser rate than that of the resilient members 26 and 29.

The bimetallic member 28 will, therefore, have a differential or positive accelerating force, which is represented as D on Fig. 13, when the impact pin and bimetal are at their neutral position. This accelerating force produced by the bimetallic member 28, in addition to the kinetic energy, causes the impact pin and member 28 to progress beyond the neutral position. As they pass the neutral position, the main resilient member 26 and auxiliary resilient member 29 reverse their action of their forces and aid the travel. The accelerating force is the net difference between the total biasing force of main resilient member 26 and auxiliary resilient member 29 and the operating bimetallic member 28, and is directly proportional to the distance moved from the original static position at a constant temperature. This condition, in turn, ensures the desired snap action of the bimetallic member 28 and impact pin 24.

As the bimetallic member 28 changes in temperature so as to return to its original position, it builds up an equal and opposite force from that which it possessed when snapping from its first static position. However, as hereinabove described, the main resilient member 26 and auxiliary resilient member 29 will, through their cooperation with impact pin 24, hold the bimetallic member in the second static or fixed position until the force produced by the bimetallic member again equals, or is greater than, the two-ounce setting of the resilient members 26 and 29. When the bimetallic member 28 does develop a force equal to or greater than two ounces, the free end thereof, in cooperation with the impact pin 24, will return to its original fixed or first static position with a snap action, in a manner hereinabove described.

It is, therefore, obvious that due to the predetermined configuration of the main resilient member 26 and the mounting of impact pin 24 upon substantially the central portion of the resilient member 26, and the relative position of adjusting screw 41 with the auxiliary resilient member 29 and the cooperation of fingers 33 thereof with the free end of bimetallic member 28, such resilient members 26 and 29 insure a snap action of the bimetallic member 28 and the impact pin 24, and, therefore, prohibit any creeping action of the bimetallic member.

When assembling the thermostat 10, the contact arm 20 is positioned in cooperation with the slot or notch 72 of impact pin 24. The notch 72 has a width of substantially 2A as shown in Figs. 2, 3 and 13 plus the thickness of the contact arm 20. This permits the impact pin assembly to move a distance of 2A from a static position before the contact arm 20 is engaged.

The contact arm 20 has a distance of travel between the upper and lower contacts 16 and 18 of 2B shown on Figs. 2 and 13. Accordingly, the impact pin assembly moves a distance of 2A plus 2B before it is restrained in its travel by the engagement of the movable contacts with the second set of stationary contacts 16 or 18. It will be understood that, when the impact pin assembly 25 has traveled a distance of 2A plus B, the contact arm 20 will be substantially in its neutral position. It, therefore, follows that during the last "B" distance of travel the resilient member 22, located upon the contact arm 20, will aid such travel and ensure a snap action of the contacts with an increased "making" contact pressure. This total contact pressure is illustrated by E in Fig. 13.

It is, therefore, obvious that inasmuch as the impact pin assembly moves a distance of 2A before engaging the contact arm 20, the contacts will be prevented from creeping. Accordingly, it is apparent that the thermostat would be snap-acting in operation regardless of the type or character of the heat-responsive device.

With the thermostat 10 operatively associated with a plurality of circuits (not shown), and the bimetallic member 28 operatively associated with a body such as a water heater (not shown) that is heated in accordance with the operation of such thermostat, the thermostat will, due to the operation of the bimetallic member 28, control the operations of the circuits, as hereinafter described. The number of controllable circuits depends upon the number of contacts mounted upon contact arm 20 and insulated support 14, as will be understood. Since such circuits are well known in the art and form no part of my present invention, I have not deemed it necessary to illustrate the same.

Assuming that the movable contact arm 20, the impact pin 24 and bimetallic member 28 are in their lower positions, and that the bimetallic member 28 is subjected to the body (not shown) which is being heated, the bimetallic member 28 will attempt to bend or flex upwardly as such body is heated. However, due to the downward biasing actions of the main resilient member 26 and auxiliary resilient member 29, through impact pin 24 on the bimetallic member 28, such bimetallic member will remain in its original position until the upward force produced therein exceeds the downward biasing action of such resilient members 26 and 29. This will occur when the heated body has arrived at the predetermined set value, at which it is desired to disconnect the power supply from the heating element. When the upward force produced by the bimetallic member 28 slightly exceeds the downward biasing action of the springs 26 and 29, the impact pin 24 will be moved upwardly with a snap action, in a manner hereinabove described.

Due to the cooperative action of impact pin assembly 25 and movable contact arm 20, the bimetallic member 28 and impact pin 24 will move a distance 2A, as hereinabove described and shown on graph (Fig. 13), before the impact pin 24 contacts the movable contact arm 20. By the time the impact pin 24 strikes the movable contact arm 20, such pin has attained a sufficient momentum or kinetic energy in addition to the upward differential force of the bimetallic member 28 to cause the movable contact arm 20 to be carried across the air gap 2B. This action first overcomes the independent negative contact biasing pressure C, superimposing the action of resilient member 22 upon the action of the main resilient member 26 and auxiliary member 29.

As the impact pin 24 first strikes contact arm 20, it need only move such contact arm a distance B, overcoming the initial restraining action of spring 22 during such distance, before the action of such resilient member 22 causes the arm to proceed on with an aiding force, as hereinabove described. The impact pin 24 and contact arm 20 thus move together, resulting in a contact pressure immediately following the operation of the thermostat substantially equal to E, which is 2D plus C'; shown in Fig. 21. At the conclusion of this operation, the power supply will be disconnected from the heating element and the heated body will slowly cool.

The bimetallic member 28 will then tend to reverse its flexure as the body cools, producing a force in an opposite direction from that resulting in its original operation. The large contact pressure immediately following the operation will then be reduced, to that shown as C in Fig. 13, which is the amount due to the resilient member 22 biasing the movable contact arm 20 against the stationary contacts 16 or 18. It, therefore, follows that the movable contact arm 20 will be biased against the stationary contacts, with a minimum positive force C or C' regardless of the position of the contacts or the heating cycle, except during the switching operation.

As the body continues to cool, the bimetallic member will bias the impact pin towards the original position with an increasing force. Then as the bimetallic member again overcomes the combined reverse action of the main resilient member 26 and auxiliary resilient member 29, the thermostat will operate in its reverse cycle in a manner similar to that hereinabove described. However, in this case the bimetallic member 28 will force the impact pin downwardly against the action of the main resilient member 26 and auxiliary resilient member 29.

The impact pin assembly 25 again moves a distance of 2A before engaging contact arm 20. The contact arm 20 also moves a distance of 2B with the impact pin assembly 25 before the movable contacts 17 and lower stationary contacts 18 reengage. This action will also be snap-acting in a manner hereinabove described.

It is, therefore, obvious that a thermostat built in accordance with my invention will be snap-acting in action in both directions, regardless of the number of contacts embodied therein, and that such thermostat will be made so snap-acting, due, among other things, to the combined action of the main and auxiliary resilient members which, while being in cooperative engagement with the heat-responsive device, nevertheless decreasingly resists the movement of the heat-responsive device from an initial static position.

It is further obvious that due to the ability to regulate the operation of the heat-responsive device, by means of adjusting the horizontal biasing action of resilient member 29, the thermostat may be adjusted to operate on practically any desired temperature amplitude; and that, due to the ruggedness of the assembled thermostat, such thermostat will not become unadjusted regardless of the amount of shock or vibrations to which it may normally be subjected.

It is still further obvious that due to the ease in adjusting the position of adjusting screw 41, which, in turn, adjustably varies the pressure supplied by the auxiliary resilient member 29, the thermostat may be adjusted within extremely small variations.

Various modifications may be made in the device embodying my invention without departing from the spirit and scope thereof, and I desire, therefore, that only such limitations shall be placed thereon as are imposed by the prior art and the appended claims.

I claim as my invention:

1. A heavy-duty thermostat, including a stationary and a cooperating movable contact, a heat-responsive device for operating said movable contact, a first resilient member for movably supporting said movable contact in both directions of movement, and means comprising a second resilient member compressed into an elastic curve and a third resilient member associated with the heat-responsive device for producing a snap action of said device and movable contact.

2. A heavy-duty thermostat, including a stationary and a cooperating movable contact, a heat-responsive device for operating said movable contact, and means comprising a first resilient member compressed into an elastic curve and secured to said movable contact and a second resilient member engaging the heat-responsive device for producing a snap action of said device and movable contact.

3. A heavy-duty thermostat, including a stationary and a cooperating movable contact, a heat-responsive device for operating said movable contact, a first resilient member for movably supporting said movable contact in both directions of movement, and means comprising a frictionlessly operating resilient member and longitudinally biasing resilient member for biasing the heat-responsive device and first resilient member for snap action, said second and third named resilient members being compressed to produce a freedom of overcenter action.

4. A heavy-duty thermostat, having a plurality of cooperating contacts including at least one movable contact, a resilient member for movably supporting said movable contact in both directions of movement, said resilient member being rigidly attached to the movable contact, a heat-responsive device, a U-shaped resilient member, a frictionlessly operated resilient member adapted to cooperate with the U-shaped member for biasing the heat-responsive device for snap action, and means comprising the heat-responsive device and the first-named resilient member for producing a snap action of the movable contact.

5. In a thermostat including a casing, a frictionless resilient member rigidly attached to the casing and compressed into an elastic curve, a second resilient member, a bimetallic heat-responsive device biased for snap action by said resilient members, a contact bar movably mounted within the casing, a third resilient member confined to an elastic curve and rigidly attached at both ends to the contact bar for biasing the contact bar for snap action, and means including the snap action of the bimetallic heat-responsive device for producing snap action of the contact bar.

6. In a thermostat comprising, in combination, a casing, a frictionless resilient member rigidly attached to the casing and compressed into an elastic curve, a second resilient member, an impact pin rigidly attached to substantially the central portion of the first resilient member, a bimetallic heat-responsive device rigidly attached at one end thereof to the casing and operatively associated with the impact pin and second resilient member at the other end thereof, said resilient members cooperating with the bimetallic device for producing a snap action of the heat-responsive device, a shoulder pin attached to the casing, a contact bar loosely mounted to the casing at one end by means of the shoulder pin, and a third resilient member confined to an elastic curve and rigidly attached at its end to the contact bar for movably supporting the second end of the contact bar and for producing a snap action of such contact bar.

7. A thermostat including, in combination, a movable contact arm, a resilient member biased into an elastic curve and rigidly attached to the contact arm, and a second and third cooperating resilient members operatively associated with the first resilient member for producing a snap-acting motion of the contact arm.

8. A thermostat including, in combination, a casing, a movable contact arm, a resilient member biased into an elastic curve and rigidly attached to the contact arm, a second resilient member, means attached to the second resilient member and operatively associated with first resilient member and contact arm for retaining the second resilient member within a double elastic curve and a third resilient member, said second and third resilient members cooperatively associated with the first resilient member for producing a snap-acting motion of the contact arm.

9. A thermostat comprising, in combination, a plurality of cooperating contacts including a movable contact, an impact pin operatively associated therewith, a plurality of resilient members, one of which is adapted to actuate said movable contact, a heat-responsive device operatively associated with the impact pin, a second of said resilient members and said heat-responsive device associated with the impact pin, and a third resilient member engaging the bimetallic member adapted to cooperate with the second resilient member to produce snap-acting movement of the movable contact at a predetermined temperature setting of the heat-responsive device.

EARL K. CLARK.